United States Patent [19]

la Rocca

[11] 4,319,120
[45] Mar. 9, 1982

[54] METHOD AND APPARATUS FOR THE CONTROL OF SHIELDING GASES USED IN POWER LASER PROCESSES

[75] Inventor: Aldo Vittorio la Rocca, Moncalieri, Italy

[73] Assignee: Fiat Auto S.p.A, Turin, Italy

[21] Appl. No.: 119,905

[22] Filed: Feb. 8, 1980

[30] Foreign Application Priority Data

Mar. 5, 1979 [IT]  Italy ............... 67465 A/79

[51] Int. Cl.³ .......................................... B23K 27/00
[52] U.S. Cl. ................. 219/121 FS; 219/121 L; 219/121 LM; 219/121 LY
[58] Field of Search ............ 219/121 FS, 121 LY, 219/121 L, 121 LM, 121 EZ, 121 EX, 121 EB, 121 EM

[56] References Cited

U.S. PATENT DOCUMENTS

| | | | |
|---|---|---|---|
| 3,271,556 | 9/1966 | Harris | 219/121 EZ X |
| 3,626,141 | 12/1971 | Daly | 219/121 FS X |
| 3,742,183 | 6/1973 | Castro et al. | 219/121 FS |
| 3,824,368 | 7/1974 | Locke | 219/121 LM |
| 4,000,392 | 12/1976 | Banas et al. | 219/121 FS X |
| 4,038,663 | 7/1977 | Day et al. | 219/121 FS X |
| 4,078,167 | 3/1978 | Banas et al. | 219/121 FS X |
| 4,127,761 | 11/1978 | Pauley et al. | 219/121 L |
| 4,128,753 | 12/1978 | Sharp | 219/121 FS X |
| 4,149,062 | 4/1979 | Limmer et al. | 219/121 FS X |

*Primary Examiner*—C. L. Albritton
*Attorney, Agent, or Firm*—Sughrue, Mion, Zinn, Macpeak & Seas

[57] ABSTRACT

In order to remove the plasma cushion and loose metal material created by the action of the laser on a metal workpiece, a shielding gas jet is directed from a nozzle across the workpiece surface through the zone of action of the laser beam.

The shielding gas rather than being allowed to go to waste is collected, purified of the metal material contained therein and fed back to the nozzle. This recirculation of the shielding gas is effected in ducting which incorporates in succession between the gas-collecting input end and the nozzle, a diffuser to slow the gas, a cooling chamber, a separator for removing metal particles condensed out of the stream, a pump, a filter and further cooling means.

8 Claims, 3 Drawing Figures

METHOD AND APPARATUS FOR THE CONTROL OF SHIELDING GASES USED IN POWER LASER PROCESSES

The present invention relates to the control of shielding gas used in power-laser processes carried out on metal workpieces, such processes including, for example, cutting, drilling, welding and thermal treatments (coating of material, alloying or surface hardening).

In the aforementioned laser processes and particularly in cases where the laser radiation energy absorbed by the workpiece causes surface vaporization, a "plume" of plasma is produced which comprises a mixture of the ambient gases together with the vapours emitted from the workpiece. This plasma plume forms a cushion interposed between the laser radiation generator and the workpiece which reduces the efficiency of the process.

This reduction in efficiency is due both to the fact that the cushion of plasma acts as a "cover" which absorbs the laser radiation, reducing the transmission of the energy of the laser beam to the surface of the workpiece ("blanketing" phenomenon), and to the fact that the plasma, being both of a non-uniform nature and in rapid turbulant motion, appreciably diffracts the laser beam so that its focussing is upset resulting in a reduction in the intensity of the energy transmitted to the intended point of action of the laser beam on the workpiece surface.

In order to reduce the disadvantageous effects resulting from the formation of the plasma cushion, it has already been proposed to direct a shielding gas stream (typically helium) through an inclined nozzle onto the zone of the workpiece surface being acted upon by the laser beam. Where the workpiece is being moved relative to the laser beam, a further, low-speed, gas stream (typically of argon) can, if necessary, be arranged immediately downstream of the shielding gas stream (considered in terms of the direction of relative movement of the workpiece and the laser beam). In certain cases (cutting or welding processes with total penetration) the shielding gas can also be fed onto the surface of the workpiece opposite the one being treated.

The prior art methods of using the shielding gas do not, however, lead to a substantial improvement in the efficiency of the overall process and require substantial quantities of shielding gas which considerably effects the operating cost of the laser process.

Indeed, the cost of the shielding gases constitutes a large proportion of the total cost of the consumable materials used in the process and, particularly in Europe, where the cost of helium is high, the shielding gas cost may account for between 30 and 40% of the operating costs.

It is therefore an object of the present invention to provide a method and apparatus for controlling shielding gases used in power-laser processes which makes it possible to effect not only a substantial increase in the efficiency of the process, but also an improvement in the quality of the treated workpiece and a substantial reduction in the consumption of shielding gas.

Accordingly, in one aspect the present invention provides a method of controlling shielding gases used in power laser processes carried out on metal workpieces, comprising the steps of:

(a) supplying a high-speed jet of shielding gas to the zone of the workpiece surface being subjected to the action of the laser radiation, said jet of shielding gas being directed parallel to the workpiece surface in adherence therewith and serving to remove by entrainment into the jet both metal particles separated from the workpiece by the action of the laser radiation and the cushion of plasma generated by the laser radiation, (b) collecting the said shielding gas with the matter entrained therein and passing the gas back along a return path to supply the shielding gas jet whereby to cause the said shielding gas to circulate around a circuit, and (c) effecting along the said return path the successive operations of slowing down the gas by diffusion, cooling the said gas to a low temperature to condense into solid particles liquid metal entrained therein, separating the solid metal particles from said gas, subjecting said gas to a pumping action in order to maintain the gas in flow around the said circuit, filtering the said gas, and cooling the said gas in order to compensate for the heating effect of said pumping action.

Generally, the power-laser process involves moving the workpiece in a predetermined direction relative to the laser beam and in this case the shielding gas jet is directed transversely to said predetermined direction.

Preferably, the shielding-gas control method includes the additional steps of measuring the mass flow rate of the gas in the said return path and supplying, in dependence on the measured mass flow rate, fresh shielding gas from an external source into the said return path upstream of the zone of filtering in order to keep constant the mass flow rate of the shielding gas to the surface which is being treated.

Preferably, the shielding gas is fed to the workpiece to be treated at supersonic velocity and the cooling of the gas is effected at a temperature corresponding to that of liquid nitrogen.

In addition to recirculating a main stream of shielding gas for removing the plasma cushion, two streams of working gas can be provided on respective sides of the shielding gas stream each with its own separate recirculation circuit, the purpose of these working gas streams being to physically and/or chemically act on the surface of the workpiece upstream and downstream of the zone of the workpiece surface currently acted upon by the laser beam. For the purposes of protection, each of the two working gas streams is partially enclosed by a stream of neutral gas.

According to another aspect of the invention, there is provided apparatus for effecting the shielding-gas control method of the invention, the apparatus comprising recirculation ducting having facing inlet and outlet ends, and incorporating a nozzle provided at the outlet end of the ducting for directing said high-speed jet of shielding gas to the zone of the workpiece surface being subjected to action of the laser radiation, a diffuser arranged at the inlet end of said ducting and serving to collect and slow the shielding gas jet together with the matter entrained therein, first cooling means for cooling the collected gas, a separator arranged to separate condensed metal particles from the cooled gas, a pump for maintaining the circulation of shielding gas around the circuit comprising the ducting and the external path between its outlet and inlet, a filter arranged downstream of the pump, and second cooling means for cooling the gas after passage through the pump.

A method according to the invention and apparatus embodying the invention, both for controlling shielding gas used in a power laser process, will now be particularly described, by way of example, with reference to the accompanying diagrammatic drawings, in which.

Figure 1:
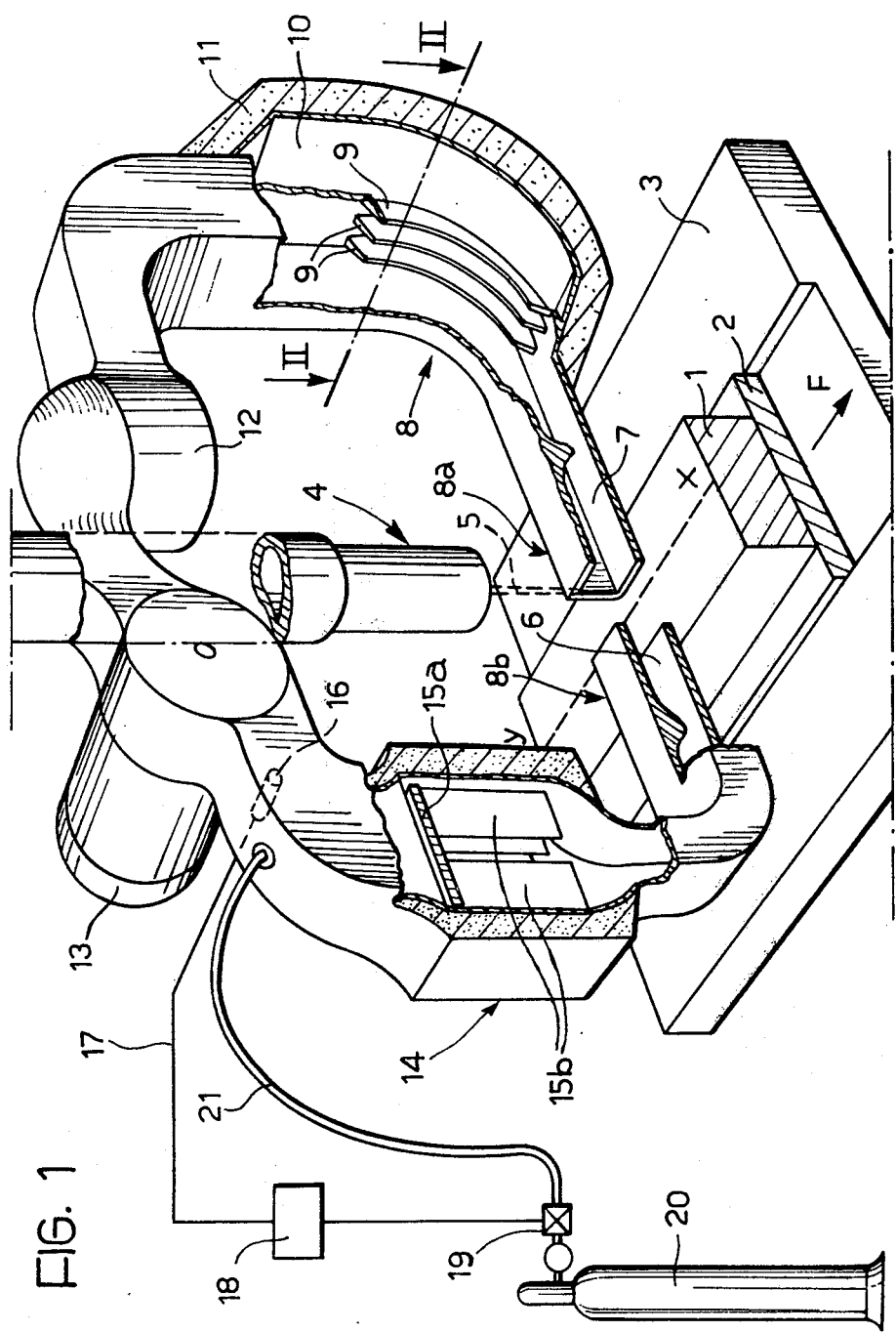
FIG. 1 is a partially sectioned perspective view of the apparatus.

As shown in FIG. 1, a metal workpiece 1 to be subjected to the action of laser radiation is mounted on a slide 2 arranged to move in the direction of arrow F along a support plate 3. Positioned above the support plate 3 is a laser radiation generator arranged to generate and focus a laser beam on the upper surface of the workpiece such that as the slide 2 and workpiece 1 are moved in the direction of arrow F, the beam 5 acts on the workpiece 1 along the line indicated by XY.

The shielding-gas control apparatus comprises a supersonic nozzle 6 arranged to supply a jet of shielding gas, preferably helium, to the zone of the workpiece surface surrounding the point of action of the laser beam 5.

The nozzle 6 is shaped and arranged so as to direct the jet of shielding gas parallel to the workpiece surface being treated and at right angles to the line XY, the shielding gas jet aerodynamically adhering to the surface under treatment.

The depth of the shielding gas jet considered perpendicularly to the surface being treated, is equal to the maximum height attainable by the jet of vapour and of ionized particles (the plasma plume) emitted from the workpiece 1 under the action of the laser beam 5.

For moderate laser-beam power levels, as a first approximation it may be assumed that the vapour and the particles are emitted at a sonic or sub-sonic velocity dependent on the temperature of the vapour.

During operation of the laser beam 5 in the presence of the shielding gas jet there thus occurs an interaction between two orthogonal streams, one of which is the supersonic stream formed by the shielding gas jet and the other of which is a sonic or sub-sonic stream formed by the vapour and particles coming from the workpiece surface; the trajectory of the latter stream inside the former can be determined by an appropriate method.

The jet of shielding gas thus acts in the manner of an ejector pump to sweep away the matter coming from the surface being treated (that is, the superheated, partially or totally ionized, vapour and the solid and/or liquid particles) capturing this matter within itself and removing it from the path of the laser beam 5.

The jet of shielding gas containing the matter coming from the workpiece 1 is collected by a diffuser 7 arranged at the input end 8a of recirculation ducting 8 which is provided at its output end 8b with the supersonic nozzle 6.

The shielding gas jet is slowed down in the diffuser 7 and then passes into a heat exchanger (FIGS. 1 and 2) comprising a plurality of hollow fins 9 the interiors of which communicate with a chamber 10 containing liquid nitrogen (temperature 195.8° C.). The liquid nitrogen cools the fins 9 to a very low temperature so that as the shielding gas stream flows over the external surfaces of the fins 9 the metal material in the shielding gas is condensed.

The heat exchanger is thermally insulated from the surrounding environment by a coating of insulating material 11.

Upon leaving the heat exchanger the shielding gas stream is passed through a centrifugal separator 12 where due to its lesser molecular weight, the shielding gas is separated from the heavier metal material particles and exits through the central zone of the separator 12.

The shielding gas leaving the separator 12 is fed to centrifugal pump 13 which compensates for pressure head losses around the circuit followed by the shielding gas stream and thereby serves to maintain the flow of the shielding gas. The gas leaving the pump 13 is passed through a cooling filter surface 15a and cooling fins 15b. The supersonic nozzle 6 is connected to the exit of the filter 14.

In order to compensate for any losses of shielding gas in the circuit described above, a mass flow rate sensor 16 is provided for in the duct 8, between the pump 13 and the filter 14.

The output electrical signal from the sensor 16 is fed via a conductor 17 to a control apparatus 18 which, when the mass flow rate drops below a predetermined value, is arranged to open valve 19 of a cylinder 20 containing shielding gas in order to supply fresh gas through a duct 21 into the ducting 8 upstream the filter 14 with a view to replenishing the circulating shielding gas stream.

Figure 2:
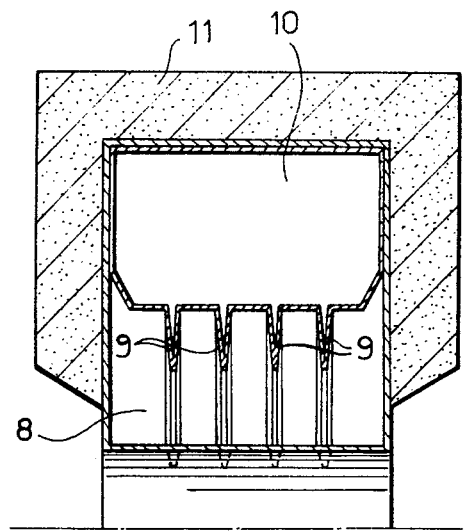
FIG. 2 is a section on line II–II of FIG. 1, to an enlarged scale.
Figure 3:
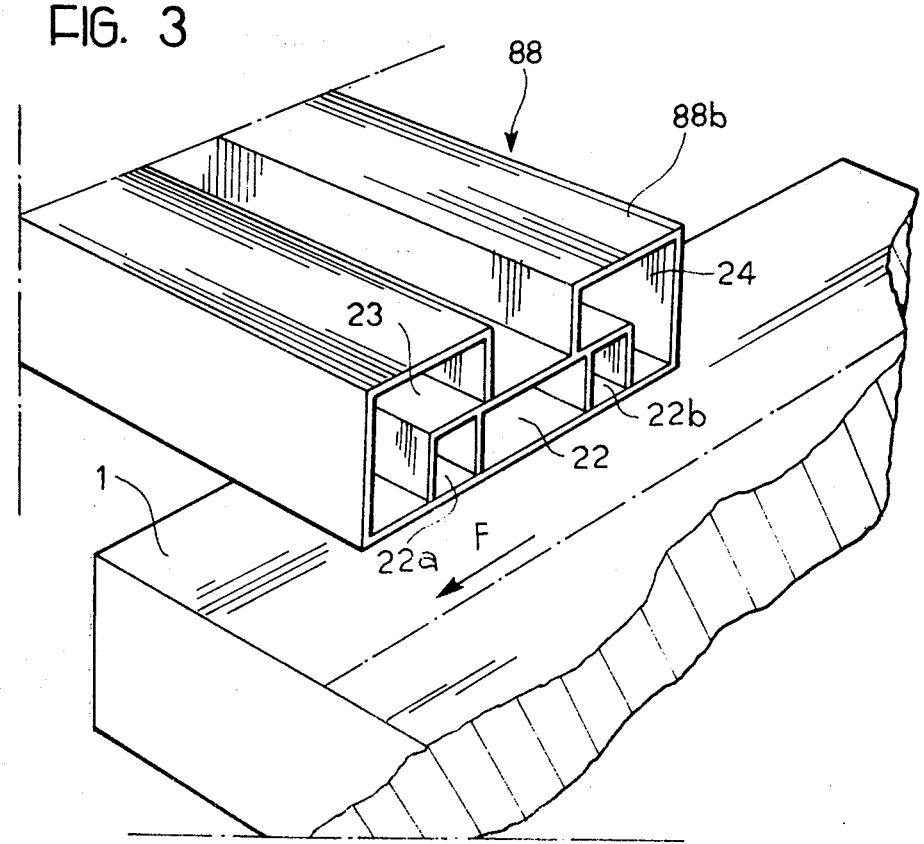
FIG. 3 is a perspective view of a part of a modified form of the apparatus.

In the modified form of apparatus the shielding gas recirculation ducting 88 (the output end 88b of which is shown in FIG. 3) differs from the ducting 8 shown in FIGS. 1 and 2 in that it is subdivided into a plurality of ducts.

The said ducts comprise a central duct 22 in which the shielding gas, usually helium, circulates and two lateral ducts, 22a and 22b respectively.

In the duct 22a there circulates a pre-treatment working gas or fluid, and in the duct 22b there circulates a post-treatment working gas or fluid.

The ducts 22a and 22b are each bounded to one side and above by a respective duct 23, 24, in which a neutral gas, for example, argon, circulates.

The working gases or fluids which circulate in the ducts 22a and 22b are intended to effect either a physical action (such as heating or cooling—in the latter case a fluid comprising water or a saturated vapour can be used) or a surface chemical action in pre- and post-treatment processes intended to improve the composition and the properties of the surface layer of the workpiece 1 (nitriding, case-hardening) and to change its laser-radiation absorption capacity (pre-blackening by use, for example, of methane gas as the working gas in the duct 22a).

The said working gases may also be selected to have other properties beneficial to the laser treatment, for example, the working gases may be chosen such that they form, under the action of the laser beam or of the vapours generated by its action, phases of a higher melting point and with greater ionization potential, or they may be used to vary the surface tension of the liquid phases produced by action of the laser to significantly affect the respreading of melted workpiece metal over the workpiece surface during cutting and penetration welding processes.

The described method and apparatus makes it possible to achieve, in a controllable manner, a combination of the following effects:

(1) removal by mechanical action (fluid dynamic) of the cushion of plasma so as to increase the transparency to laser radiation of the medium (ambient gas plus shielding gas) above the workpiece;

(2) reduction in the quantity of plasma present by prevention of its growth and replacement of the ambient atmosphere with a gas which is not as easily ionizable (that is, a gas which is more transparent to the laser radiation and has a greater ionization potential) together with cooling of the ambient gas;

(3) protection of the surface of the workpiece from undesirable chemical reactions with the ambient gas (oxidation, nitriding, carburetion, etc.) which may influence the metallurgical and other physical properties (such as surface tension) of the workpiece;

(4) in cases where working fluids or gases are used in addition to the shielding gas, physical and/or chemical treatment of the workpiece surface (both before and after it has been subjected to the action of the laser beam) in order to improve the properties and composition of the surface layer and to change its absorption capacity; and (5) minimization of the quantity of gases used by effecting a recirculation of these gases.

I claim:

1. A method of controlling shielding gas used in power laser processes carried out on metal workpieces, comprising the steps of:
   (a) supplying a high-speed jet of shielding gas to the zone of the workpiece surface being subjected to the action of the laser radiation, said jet of shielding gas being directed parallel to the workpiece surface in adherence therewith and serving to remove by entrainment into the jet both metal particles separated from the workpiece by the action of the laser radiation and the cushion of plasma generated by the laser radiation,
   (b) collecting the said shielding gas with the matter entrained therein and passing the gas back along a return path to supply the shielding gas jet whereby to cause the said shielding gas to circulate around a circuit, and
   (c) effecting along the said return path the successive operations of:
   slowing down the gas by diffusion,
   cooling the said gas to a low temperature to condense into solid particles liquid metal entrained therein,
   separating the solid metal particles from said gas,
   subjecting said gas to a pumping action in order to maintain the gas in flow around the said circuit,
   filtering the said gas, and
   cooling the said gas in order to compensate for the heating effect of said pumping action.

2. A shielding-gas control method according to claim 1 for use in power laser processes in which said workpiece and laser are moved relative to each other in a predetermined direction, wherein said shielding gas jet is directed perpendicularly to said predetermined direction.

3. A shielding-gas control method according to claim 1 or claim 2, characterised in that it further comprises the additional steps of measuring the mass flow rate of the gas in the said return path and supplying in dependence on the measured mass flow rate, fresh shielding gas from an external source into the said return path in order to maintain constant the mass flow rate of the shielding gas to the workpiece surface subjected to the action of the laser beam.

4. A shielding-gas control method according to claim 1 or claim 2, wherein said shielding gas in said jet is moving supersonic velocity.

5. A shielding-gas control method according to claim 1 or claim 2, wherein the cooling of said shielding gas is effected cryogenically.

6. A shielding-gas control method according to claim 2, wherein the circulating stream of shielding gas is flanked by two streams of working gases circulated in the same manner as the shielding gas and arranged to act on the surface of the workpiece upstream and downstream respectively of the zone of action of the laser considered in terms of the direction of movement of the workpiece relative to the laser, each of the said two working gas streams being partially enclosed by a protective stream of a neutral gas.

7. Apparatus for effecting the shielding-gas control method of claim 1, comprising recirculation ducting having facing inlet and outlet ends and incorporating:
   a nozzle provided at said outlet end of the ducting for directing said high-speed jet of shielding gas to the zone of the workpiece surface being subjected to action of the laser radiation,
   a diffuser arranged at the inlet end of said ducting and serving to collect and slow said shielding gas jet together with said matter entrained therein,
   first cooling means for cooling the collected gas,
   a separator arranged to separate condensed metal particles from the cooled gas,
   a pump for maintaining the circulation of shielding gas around the circuit comprising the ducting and the external path between said outlet and inlet,
   a filter arranged downstream of the pump and
   second cooling means for cooling the gas after passage through the pump.

8. Apparatus according to claim 7, wherein said ducting is divided into a plurality of side by side ducts each forming part of a separate gas recirculation circuit.

* * * * *